United States Patent
Kang et al.

(10) Patent No.: US 10,757,699 B2
(45) Date of Patent: Aug. 25, 2020

(54) DOWNLINK PRIORITIZATION IN TDD BASED LBT SYSTEMS

(71) Applicant: Telefonaktiebolaget LM Ericsson (publ), Stockholm (SE)

(72) Inventors: Du Ho Kang, Upplands Väsby (SE); Jung-Fu Cheng, Fremont, CA (US); Laetitia Falconetti, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/774,775

(22) PCT Filed: Nov. 9, 2015

(86) PCT No.: PCT/EP2015/076038
§ 371 (c)(1),
(2) Date: May 9, 2018

(87) PCT Pub. No.: WO2017/080572
PCT Pub. Date: May 18, 2017

(65) Prior Publication Data
US 2018/0332579 A1    Nov. 15, 2018

(51) Int. Cl.
*H04W 72/04*    (2009.01)
*H04W 72/12*    (2009.01)
(Continued)

(52) U.S. Cl.
CPC ......... *H04W 72/0446* (2013.01); *H04L 5/14* (2013.01); *H04W 72/1247* (2013.01); *H04W 72/14* (2013.01); *H04W 74/006* (2013.01)

(58) Field of Classification Search
None
See application file for complete search history.

(56) References Cited

U.S. PATENT DOCUMENTS

2012/0294203 A1    11/2012    Koorapaty et al.
2014/0029490 A1*    1/2014    Kim ..................... H04L 5/1469
                                                                        370/280
(Continued)

FOREIGN PATENT DOCUMENTS

EP    2943030 A1    11/2015
WO    WO 2014/107063 A1    7/2014
WO    WO 2014/109688 A1    7/2014

OTHER PUBLICATIONS

International Search Report and Written Opinion of the International Searching Authority, PCT/EP2015/076038, dated Jul. 12, 2016, 10 pages.

*Primary Examiner* — Noel R Beharry
*Assistant Examiner* — Pamit Kaur
(74) *Attorney, Agent, or Firm* — Sage Patent Group

(57) ABSTRACT

The present disclosure relates to a technique of prioritizing downlink transmission. More particularly, the present disclosure relates to a technique of prioritizing Downlink transmission in a Time Division Duplex wireless communication system employing a channel sensing mechanism. A method embodiment comprises: transmitting, by an access network node of the wireless communication system, an Uplink, UL, grant to a wireless communication device, the UL grant indicating that an UL transmission is planned in one or more first subframes; and prioritizing, by the access network node, Downlink, DL, transmission in one or more second subframes over the planned UL transmission, the one or more second subframes at least partially overlapping with the one or more first subframes.

15 Claims, 12 Drawing Sheets

(51) Int. Cl.
*H04L 5/14* (2006.01)
*H04W 72/14* (2009.01)
*H04W 74/00* (2009.01)

(56) References Cited

U.S. PATENT DOCUMENTS

| | | | |
|---|---|---|---|
| 2015/0092703 A1* | 4/2015 | Xu | H04L 5/003 |
| | | | 370/329 |
| 2015/0373675 A1* | 12/2015 | Seo | H04W 2/042 |
| | | | 370/280 |
| 2017/0019909 A1* | 1/2017 | Si | H04L 47/27 |
| 2018/0049221 A1* | 2/2018 | Park | H04W 74/08 |

\* cited by examiner

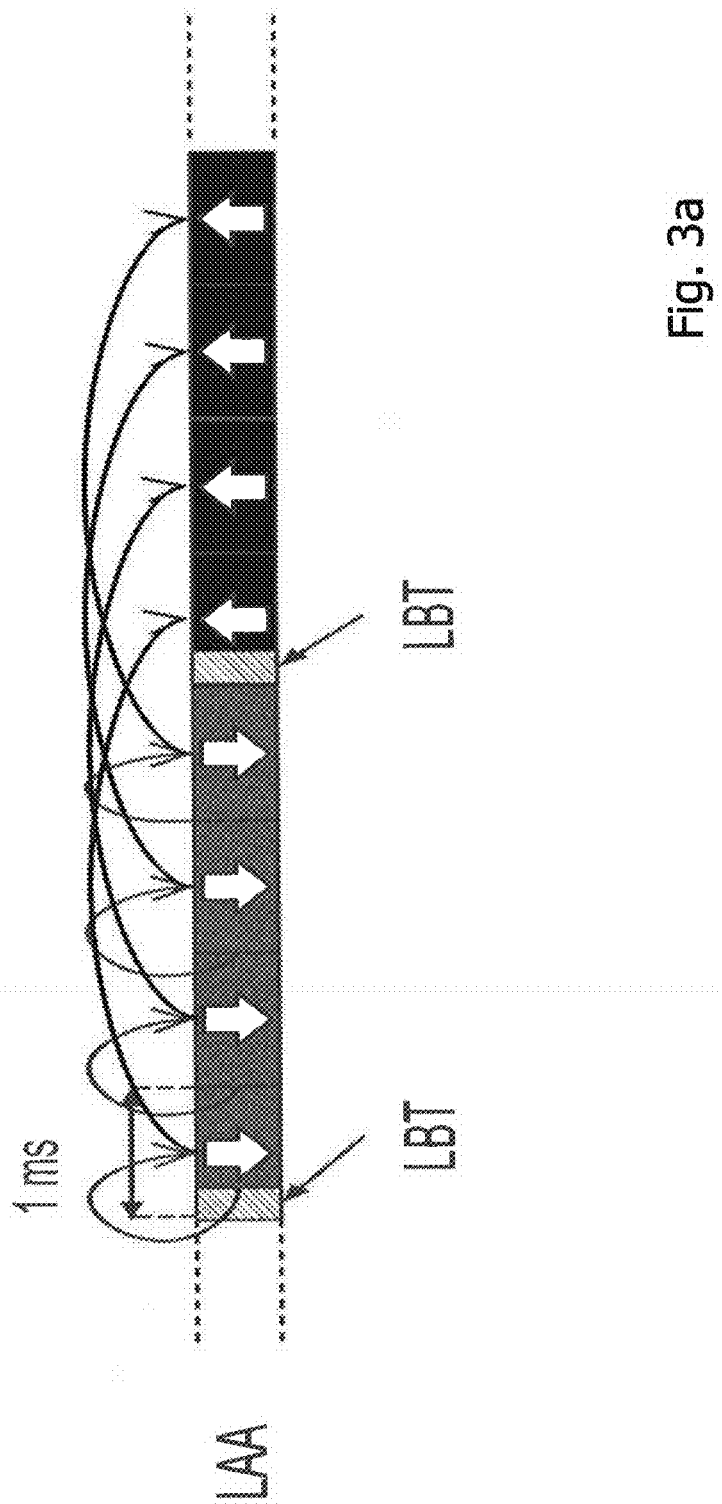

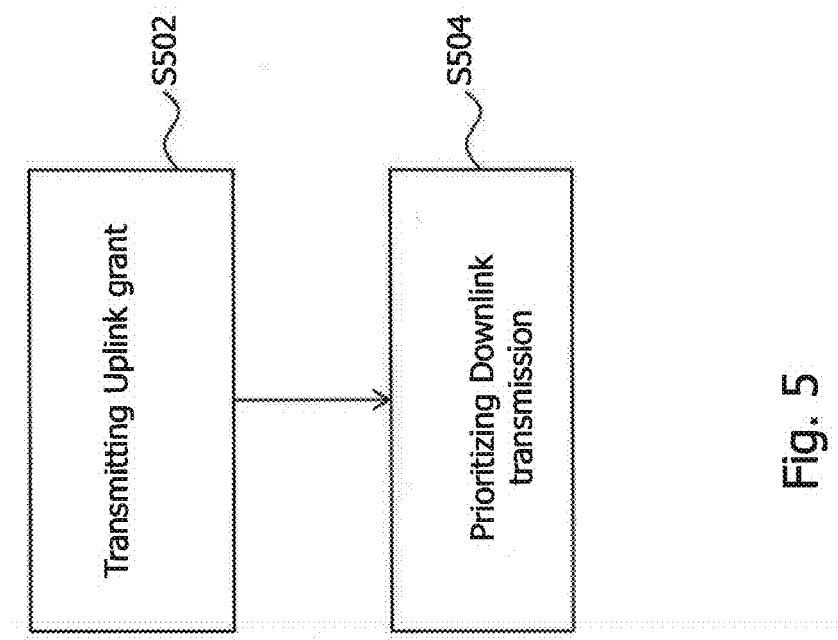

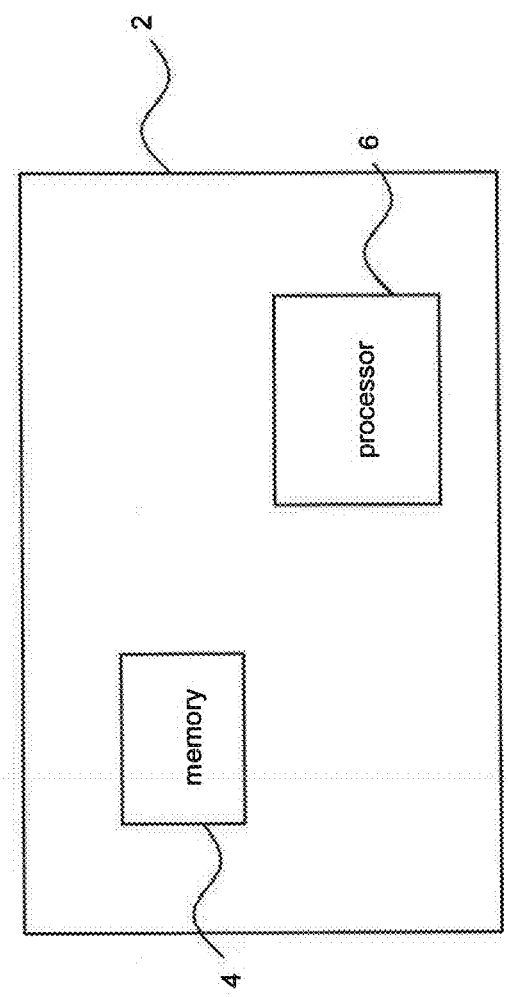

DOWNLINK PRIORITIZATION IN TDD BASED LBT SYSTEMS

CROSS REFERENCE TO RELATED APPLICATIONS

This application is a 35 U.S.C. § 371 national stage application of PCT International Application No. PCT/EP2015/076038 filed on Nov. 9, 2015 the disclosure and content of which is incorporated by reference herein in its entirety.

TECHNICAL FIELD

The present disclosure relates to a technique of prioritizing downlink transmission. More particularly, the present disclosure relates to a technique of prioritizing Downlink transmission in a Time Division Duplex wireless communication system providing a channel sensing mechanism.

BACKGROUND

Several different duplexing methods are used nowadays for channel access in point-to-multipoint networks such as cellular networks for dividing forward and reverse communication channels on the same physical communications medium. Examples of such duplexing methods include Time Division Duplex (TDD) and Frequency Division Duplex (FDD). TDD refers to duplex communication links where uplink is separated from downlink by the allocation of different time units in the same frequency band. TDD divides a data stream into frames and assigns different time units to forward and reverse transmissions, thereby allowing both types of transmissions to share the same transmission medium.

In consequence, there can be a conflict in TDD when uplink and downlink transmissions intend to access the transmission medium at the same or overlapping time unit(s) or time instance(s).

TDD is used, for example, in Long Term Evolution (LTE), and, more precisely, in Long-Term Evolution Time-Division Duplex (LTE-TDD) (also referred to as Time-division Long-Term Evolution (TD-LTE)). LTE-TDD is one of two variants of the LTE technology standard, the other being Frequency-Division Long-Term Evolution (LTE-FDD). LTE-TDD uses a single frequency, alternating between uploading and downloading data through time. Frequencies used for LTE-TDD range from 1850 MHz to 3800 MHz, with several different bands being used.

Up to now, the spectrum used by LTE is dedicated to LTE. This has the advantage that an LTE system does not need to care about coexistence with other non-3GPP (the abbreviation 3GPP normally stands for 3rd Generation Partnership Project) radio access technologies in the same spectrum and spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum.

The 3GPP initiative License Assisted Access (also sometimes referred to as Licensed Assisted Access and normally abbreviated as LAA) intends to allow LTE equipment to also operate in the unlicensed 5 GHz radio spectrum. In LAA, the unlicensed 5 GHz spectrum is used as a complement to the licensed spectrum so that throughput can be increased by utilizing radio resources from an LTE carrier in licensed as well as unlicensed spectrum. That is, aggregation of licensed and unlicensed radio resources for a wireless communication device can be implemented. Licensed radio resources can be considered to lie in a licensed band/licensed spectrum of the full frequency range that may be used for wireless communication. This whole spectrum is, in discrete bands, normally licensed to groups of similar services. Unlicensed radio resources may be considered to lie in an unlicensed band/spectrum of the full frequency range that may be used for wireless communication. Data aggregation in LAA can be achieved by carrier aggregation mechanisms.

Accordingly, devices can connect in the licensed spectrum to a primary cell and can use carrier aggregation to benefit from additional transmission capacity in the unlicensed spectrum when connected to a secondary cell. To reduce the changes required for aggregating licensed and unlicensed spectrum, the LTE frame timing in the primary cell is simultaneously used in the secondary cell.

Regulatory requirements may prohibit transmissions in the unlicensed spectrum without prior channel sensing. Since the unlicensed spectrum must be shared with other radios of similar or dissimilar wireless technologies, listen-before-talk (LBT) or other channel sensing techniques may be applied. Today, the unlicensed 5 GHz spectrum is mainly used by equipment implementing the IEEE 802.11 Wireless Local Area Network (WLAN) standard. This standard is known under its marketing brand "Wi-Fi." In Europe, the LBT procedure is under the scope of EN 301.893 regulation. For LAA to operate in the 5 GHz spectrum, the LAA LBT procedure shall conform to requirements and minimum behaviors set forth in EN 301.893.

However, additional system designs and steps are needed to ensure coexistence of Wi-Fi and LAA with EN 301.893 LBT procedures.

U.S. Pat. No. 8,774,209 B2 relates to an apparatus and method for spectrum sharing using listen-before-talk with quiet periods, where LBT is adopted by frame-based orthogonal frequency-division multiplexing (OFDM) systems to determine whether the channel is free prior to transmission. A maximum transmission duration timer is used to limit the duration of a transmission burst, and is followed by a quiet period.

In TDD based wireless communication systems employing channel sensing mechanisms, there remains the problem of potential conflicts between Uplink and Downlink transmissions.

SUMMARY

Accordingly, there is a need for an efficient technique of handling Downlink transmissions intending to access a medium, if Uplink transmissions are already planned in a wireless communication system providing a channel sensing mechanism.

According to a first aspect, a method of prioritizing Downlink (DL) transmission in a Time Division Duplex (TDD) wireless communication system is provided. The wireless communication system provides a channel sensing mechanism. The method comprises transmitting, by an access network node of the wireless communication system, an Uplink (UL) grant to a wireless communication device. The UL grant indicates that an UL transmission is planned in one or more first subframes. The method further comprises prioritizing, by the access network node, DL transmission in one or more second subframes over the planned UL transmission. The one or more second subframes at least partially overlap with the one or more first subframes.

By prioritizing the DL transmission over the planned UL transmission, the DL transmission takes place although the UL transmission was originally scheduled. In normal operation, the DL transmission would have paused and the UL transmission would have occurred as planned. In consequence, the conflict between the DL transmission and the planned UL transmission is resolved by prioritizing the DL transmission. This may be especially advantageous if urgent packets arrive at the access network node for the DL transmission.

The channel sensing mechanism may comprise various techniques for determining whether a resource (which can also be referred to as channel or medium) is free (or idle) by sensing. The medium may be or comprise or be part of any wireless or partially wired channel. To give a non-limiting example for the wireless communication system/network, the wireless communication system/network may be or comprise a Long Term Evolution (LTE) system/network, an LTE-advanced system/network, a 5G system/network and/or any wireless local area network (WLAN) based on the Institute of Electrical and Electronics Engineers' (IEEE) 802.11 standards. The access network node may be any network node of the access network of such a wireless communication network. For example, the access network node may be an eNodeB (eNB) in terms of LTE or an access point (AP) in terms of WLAN based standards. The access network node may be the access network node of a primary cell or the access network node of a secondary cell when the access network node employs LAA, for example.

For instance, the channel sensing mechanism may comprise Clear Channel Assessment (CCA) and/or Listen Before Talk (LBT) or similar or related present and future mechanisms.

To give a specific, non-limiting example, the channel sensing mechanism may comprise carrier sense multiple access (CSMA). CSMA is a probabilistic media access control (MAC) protocol in which a node verifies the absence of other traffic before transmitting on a shared transmission medium, such as an electrical bus, or a band of the electromagnetic spectrum. Carrier sense or channel sense generally means that a transmitter uses feedback from a receiver to determine whether another transmission is in progress before initiating a transmission. That is, carrier sense/channel sense tries to detect the presence of a carrier wave from another station before attempting to transmit. If a carrier is sensed (on the channel/the medium), the station waits for the transmission in progress to finish before initiating its own transmission. In other words, CSMA is based on the principle "sense before transmit" or "listen before talk". Multiple access generally means that multiple stations send and receive on the medium. Transmissions by one node are generally received by all other stations connected to the medium.

In consequence, when employing channel sensing/carrier sensing, a transmitting device normally listens to the channel for a minimum amount of time. If the channel is sensed to be occupied by another transmission, the transmitting device defers its transmission to a future time.

The channel sensing mechanism provided by the wireless communication system or network may be used or employed by any of the network nodes or elements of the wireless communication system or network, e.g. by wireless communication devices. Such wireless communication devices may be configured as User Equipments (UEs) in terms of LTE or LTE-a.

In one or more embodiments, the step of prioritizing may comprise starting, by the access network node, the DL transmission in the one or more second subframes before the planned UL transmission in the one or more first subframes is to be started. For example, the step of prioritizing may comprise starting, by the access network node, the DL transmission in the one or more second subframes before the wireless communication device starts sensing or is expected to start sensing the channel to be used for the planned UL transmission. In this way, the DL transmission can be prioritized over the planned UL transmission.

The method may comprise detecting, by the wireless communication device, the DL transmission in at least one of the one or more first subframes. The step of detecting may comprise carrier/channel sensing techniques. The method may comprise deferring, by the wireless communication device, the planned UL transmission. Alternatively, the method may comprise cancelling, by the wireless communication device, the planned UL transmission. In this way, the DL transmission can be prioritized over the planned UL transmission, while the UL transmission is deferred or cancelled.

In one or more embodiments, the step of prioritizing may comprise adapting, by the access network node, one or more channel sensing parameters, e.g. one or more LBT parameters, of the planned UL transmission. Alternatively or additionally, the step of prioritizing may comprise adapting, by the access network node, one or more channel sensing parameters, e.g. one or more LBT parameters, of the DL transmission. By adapting the one or more channel sensing parameters, e.g. the one or more LBT parameters, of the planned UL transmission, the DL transmission can be prioritized over the planned UL transmission. By adapting the one or more channel sensing parameters, e.g. the one or more LBT parameters, of the DL transmission, the DL transmission can be prioritized over the planned UL transmission.

The at least one of the one or more channel sensing parameters, e.g. the at least one of the one or more LBT parameters, of the planned UL transmission may be adapted such that the probability for the access network node to access a wireless communication medium for the DL transmission is higher than the probability for the wireless communication device to access the wireless communication medium for the planned UL transmission. As, in this case, the probability for the access network node to access a wireless communication medium for the DL transmission is higher than the probability for the wireless communication device to access the wireless communication medium for the planned UL transmission, the DL transmission is prioritized over the planned UL transmission.

The at least one of the one or more channel sensing parameters, e.g. the at least one of the one or more LBT parameters, of the DL transmission may be adapted such that the probability for the access network node to access a wireless communication medium for the DL transmission is higher than the probability for the wireless communication device to access the wireless communication medium for the planned UL transmission. As, in this case, the probability for the access network node to access a wireless communication medium for the DL transmission is higher than the probability for the wireless communication device to access the wireless communication medium for the planned UL transmission, the DL transmission is prioritized over the planned UL transmission.

The step of adapting the at least one of the one or more channel sensing parameters, e.g. the at least one of the one or more LBT parameters, of the DL transmission may comprise decreasing a duration of sensing, by the access network node, a wireless communication medium before starting the DL transmission. Alternatively or additionally, the step of adapting the at least one of the one or more channel sensing parameters, e.g. the at least one of the one or more LBT parameters, of the planned UL transmission may comprise increasing a duration of sensing, by the wireless communication device, a wireless communication medium before starting the planned UL transmission.

For example, the one or more channel sensing parameters, e.g. the one or more LBT parameters, may comprise at least one of a contention window size, a minimum sensing duration and a sensing slot duration.

In one or more embodiments, the method may comprise triggering the step of prioritizing based on one or more metrics related to the access network node.

The one or more metrics may comprise at least one of a buffer fill state of a data buffer associated with the access network node, a buffer fill rate of a data buffer associated with the access network node, an interference level measured at the access network node, and arrival of one or more urgent packets at the access network node. The one or more urgent packets may be related to at least one of control information, emergency notice information, and Quality of Service (QoS) information.

In one or more embodiments, the method may comprise adjusting, by the access network node, the transmission duration of the DL transmission.

The step of adjusting the transmission duration of the DL transmission may comprise adjusting the transmission duration of the DL transmission based on a prioritization level of the DL transmission over the planned UL transmission. The step of adjusting the transmission duration of the DL transmission may comprise reducing the transmission duration of the DL transmission.

The method may comprise instructing the wireless communication device to start at least a part of the planned UL transmission at a subframe after the end of the DL transmission, if the DL transmission ends before the end of the planned UL transmission. By adjusting, e.g. reducing, the transmission duration of the DL transmission, the wireless communication device can start at least a part of the planned UL transmission at a subframe after the end of the DL transmission having the adjusted, e.g. reduced, transmission duration. The step of instructing the wireless communication device to start at least a part of the planned UL transmission at a subframe after the end of the DL transmission may be considered independent of whether the transmission duration of the DL transmission is adjusted, e.g. reduced, or not.

According to a second aspect, a computer program is provided. The computer program comprises program code portions for causing the steps of any one of the method aspects described herein to be performed, when the computer program is run on a computer system or on one or more computing devices, e.g. an apparatus, a station, or an entity as disclosed herein. The computer program may be stored on a computer-readable recording medium or may be downloadable as a signal.

According to a third aspect, an access network node for prioritizing Downlink (DL) transmission in a Time Division Duplex (TDD) wireless communication system is provided. The wireless communication system provides a channel sensing mechanism. The access network node comprises a transmitting component and a prioritizing component. The transmitting component is configured to transmit an Uplink (UL) grant to a wireless communication device. The UL grant indicates that an UL transmission is planned in one or more first subframes. The prioritizing component is configured to prioritize Downlink (DL) transmission in one or more second subframes over the planned UL transmission. The one or more second subframes at least partially overlap with the one or more first subframes.

The term at least partially overlap may be understood to mean that the one or more second subframes overlap in part or in full with the one or more first subframes. In other words, only one of the one or more second subframes may overlap with the one or more first subframes or two or more, e.g. all, of the one or more second subframes may overlap with the one or more first subframes.

With reference to LTE, there are two types of frame structure in the LTE standard, Type 1 and Type 2. Type 1 uses Frequency Division Duplexing (uplink and downlink separated by frequency), and Type 2 uses Time Division Duplexing (uplink and downlink separated in time). An LTE frame comprises six time units: frame, half-frame, subframe, slot, symbol, and the basic time unit. The duration of one LTE radio frame is typically 10 ms. The 10 ms LTE frame comprises two half frames, each 5 ms long. The LTE half-frames are further split into five subframes, each 1 ms long, Each LTE subframe is divided into two slots of 0.5 ms each. Each LTE slot contains either six or seven OFDM symbols, depending on the Cyclic Prefix (CP) length, Frames are useful to send system information. Subframes facilitate resource allocation and slots are useful for synchronization, for example. Frequency hopping is possible at the subframe and slot levels. In TDD mode (LTE-TDD), the uplink and downlink subframes can be transmitted on the same frequency and multiplexed in the time domain.

The access network node according to the third aspect may be configured to perform any of the method steps of the method according to the first aspect described herein.

The access network node may comprise or be configured as or be part of a radio base station, a radio network controller, a NodeB, an eNodeB, a 5G base station or an access point (AP). The access network node may comprise or be configured as or be part of a primary cell and/or a secondary cell in terms of LAA. The access network node may comprise or be configured as or be part of a primary base station and/or a secondary base station in terms of DC According to a fourth aspect, a wireless communication system is provided. The wireless communication system comprises the access network node according to the third aspect as described herein and one or more wireless communication devices.

The wireless communication system according to the fourth aspect may be configured to perform any of the method steps of the method described herein.

In general, the steps of any one of the method aspects described herein may equally be embodied in one or more suitable components, devices or units, e.g. in suitable components of the access network node, and/or the system.

BRIEF DESCRIPTION OF THE DRAWINGS

In the following, the present disclosure will further be described with reference to exemplary embodiments illustrated in the Figures, in which:

FIGS. 3a and 3b are a schematic illustration of two different scheduling approaches;

FIG. 5 is a flowchart illustrating a method embodiment performed in the access network node of FIG. 4;

FIG. 7 is a block diagram schematically illustrating another device embodiment for implementing the access network node of FIG. 4.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is sometimes described with reference to specific communication networks such as LTE based networks as an example for a wireless communication network, the present disclosure may be practiced in other networks to which mobile or stationary users may attach. For example, the present disclosure is applicable to other cellular networks such as Global System for Mobile Communications (GSM) networks, Universal Mobile Telecommunications System (UMTS) networks, LTE-Advanced (LTE-A) networks, 5G networks, WiFi networks or to Wireless Local Area Network (WLAN) or similar wireless networks and a combination thereof and related future standards.

Those skilled in the art will further appreciate that functions explained herein below may be implemented using individual hardware circuitry, using software functioning in conjunction with one or more processors, e.g. a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor arrangement and a memory arrangement coupled to a processor arrangement, wherein the memory arrangement is encoded with or stores one or more programs or corresponding code to cause the processor arrangement to perform or control the methods disclosed herein when executed by the processor arrangement.

Figure 1A:
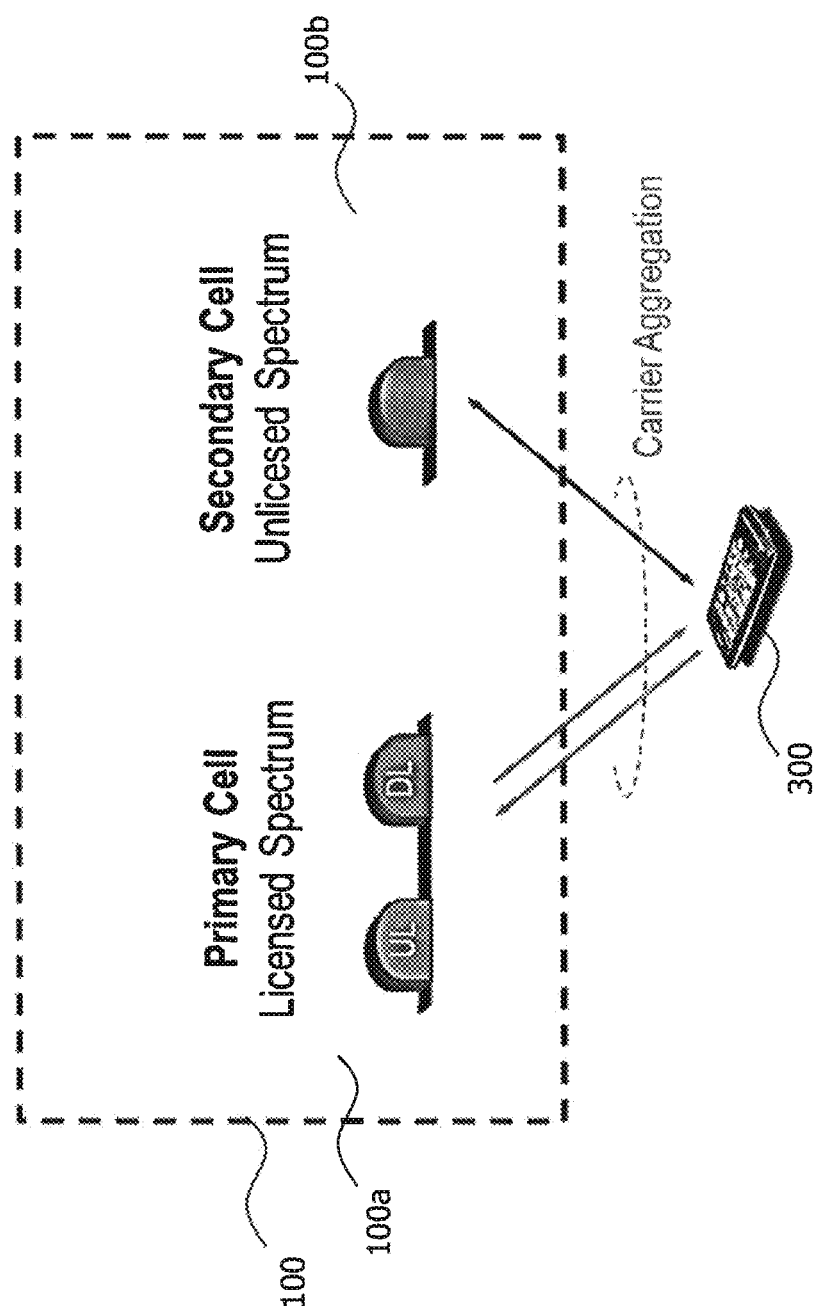
FIG. 1a is a schematic illustration of the principle architecture of License Assisted Access.

FIG. 1a schematically illustrates License Assisted Access (LAA).

As shown in FIG. 1a, with LAA to unlicensed spectrum, UE 300 is connected to a primary cell (PCell) 100a in the licensed band and one or more secondary cells (SCells) 100b in the unlicensed band. For Carrier Aggregation (CA) UE 300 receives data from one or more points on different frequencies, e.g. from one single eNB 100 that provides the licensed band (licensed spectrum) and the unlicensed band (unlicensed spectrum). Herein, SCell 100b in unlicensed spectrum can be denoted as LAA secondary cell (LAA SCell) 100b, by way of example. The PCell 100a and SCell 100b may both be implemented by/in one single eNB 100, as illustrated by way of example in FIG. 1a, which will be referred to in the following as eNB 100. In other words, in this case (which may be considered the normal implementation of LAA) eNB 100 performs the transmission on both carriers, i.e. the carriers in the licensed band and the unlicensed band, but treats the spectrum differently. LAA SCell 100b may operate in DL-only mode or operate with both UL and DL traffic. Furthermore, in future scenarios, the LTE nodes may operate in standalone mode in license-exempt channels without assistance from a licensed cell. Unlicensed spectrum can, by definition, be simultaneously used by multiple different technologies. Therefore, LAA needs to consider coexistence with other systems such as IEEE 802.11 (Wi-Fi).

In a specific implementation (which may be considered the exceptional implementation of LAA), LAA may be used in combination with Dual Connectivity (DC) with the secondary carrier using unlicensed spectrum. In this case, for example, two or more access points may be connected to UE 300. For example, eNB 100 may perform transmission on the licensed band and an access point may perform transmission on the unlicensed band. DC is briefly explained with respect to Figure ib, whereas the same reference signs as in FIG. 1a are used for illustration rather than limitation to exemplify that DC of FIG. 1b can be combined with LAA of FIG. 1a.

DC can be used for capacity enhancement and thus throughput-enhancement. DC is a feature defined from the User Equipment (UE) perspective, wherein the UE may simultaneously receive from and transmit to at least two different network points. The two different network points are usually denoted as Master-eNodeB or Primary-eNodeB (often abbreviated as MeNB 100) and Secondary-eNodeB (often abbreviated as SeNB 200). Primary-eNB 100 and Secondary-eNB 200 may operate on different frequencies. As can be seen by way of example from FIG. 1b, UE 300 can be connected to Primary-eNB 100 and/or Secondary-eNB 200. DC had been standardized in 3GPP Rel-12.

Returning to the concept of LAA as illustrated in FIG. 1a, to coexist fairly with the Wi-Fi system, transmission on SCell 100b shall conform to Listen Before Talk (LBT) protocols or other channel sensing mechanisms in order to avoid collisions and causing severe interference to on-going transmissions. This includes both performing LBT before commencing transmissions, and limiting the maximum duration of a single transmission burst.

To describe further, FIG. 1 shows TDD based LAA to unlicensed spectrum using LTE carrier aggregation and LBT to ensure good coexistence with other unlicensed band technologies. In other words, an example in the context of LAA is shown in FIG. 2, where DL and UL transmission is multiplexed in time domain. Before transmission at each transmission direction is performed, LBT is used to determine whether or not the channel intended to be used for the transmission is busy.

Figure 3B:
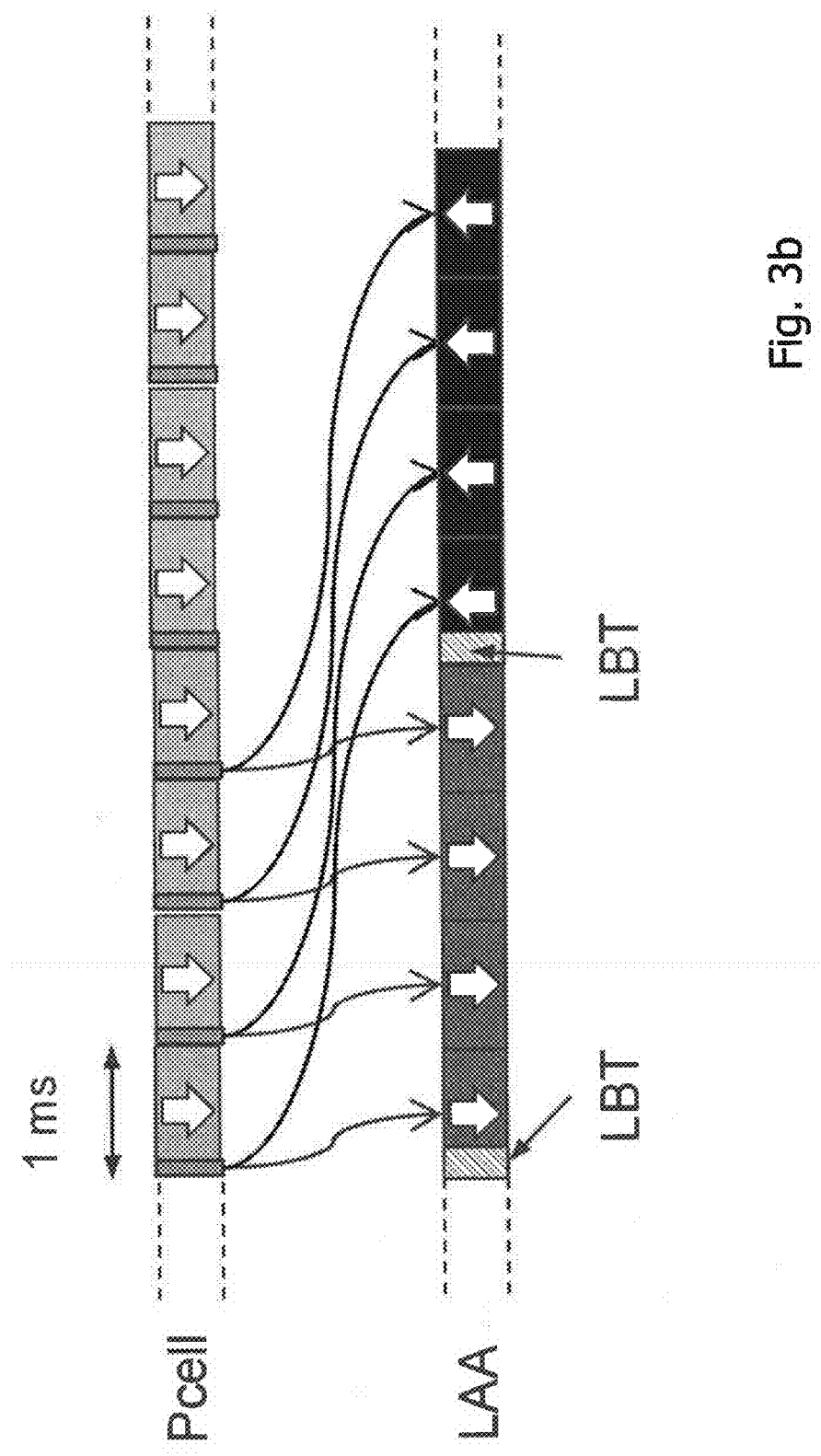

A single transmission burst refers to a transmission by a node performed after a successful channel contention. The maximum transmission burst duration is specified by country and region-specific regulations, for e.g., 4 ms in Japan and 13 ms according to EN 301.893. Downlink and Uplink transmissions can be scheduled. The LTE design supports in general two different scheduling approaches, i.e. self-scheduling as schematically shown in FIG. 3a and cross-carrier scheduling as schematically shown in FIG. 3b. The supported set of scheduling designs needs some considerations for LAA SCell 100b due to the LBT requirements on LAA SCell 100b, which differs from the previous LTE designs.

The examples of FIGS. 3a and 3b show LAA DL and UL scheduling and more particularly, scheduling control signals for DL transmission at a current subframe and similar control signals for UL transmission at four subframes later. The scheduling signals may be transmitted over the unlicensed channel.

For the case of LAA SCell 100*b* that operates in self-scheduling mode as illustrated, by way of example in FIG. 3*a*, the assumption is that the Downlink Control Information (DCI) message is provided by Enhanced Physical Downlink Control Channel (EPDCCH). In this respect, FIG. 3*a* illustrates DL and UL operation and scheduling information signals when self-scheduling is used in a TDD based LAA system. If UE 300 finds an applicable EPDCCH it would know that it has been assigned a Physical Downlink Shared Channel (PDSCH) within that subframe. On the eNB side, this type of operation is rather straightforward as either the eNB succeeds with its LBT operations or it does not. If the eNB succeeds with the LBT operation the eNB would transmit both EPDCCH and PDSCH. For subframes that do not require a new LBT procedure (not the first subframe after successful LBT) the eNB will simply transmit EPDCCH and PDSCH. For the case when LAA SCell 100*b* operates both UL+DL, UL grant signal is transmitted to indicate which user can transmit UL data. It is also noticeable that UL transmission occurs 4 ms after UL scheduling signal is transmitted in LTE system according to current LTE specification. For UL grant transmission, the DL self-carrier scheduling with EPDCCH approach can be reused to transmit UL scheduling information. For cross-carrier scheduling as shown in FIG. 3*b*, scheduling information is transmitted over PCell 100*a* or another SCell 100*b* using licensed frequency so that there is no LBT uncertainty to transmit scheduling signals.

In the architectures and the scheduling schemes described above, there may be a conflict between DL and scheduled UL transmissions. In such a conflict, the DL transmission pauses when it overlaps with the previously scheduled UL transmission, i.e. the UL transmission is performed as scheduled. This may be disadvantageous in certain situations, e.g. when DL packets of high importance arrive at the PCell 100*a* or SCell 100*b*.

Figure 1B:
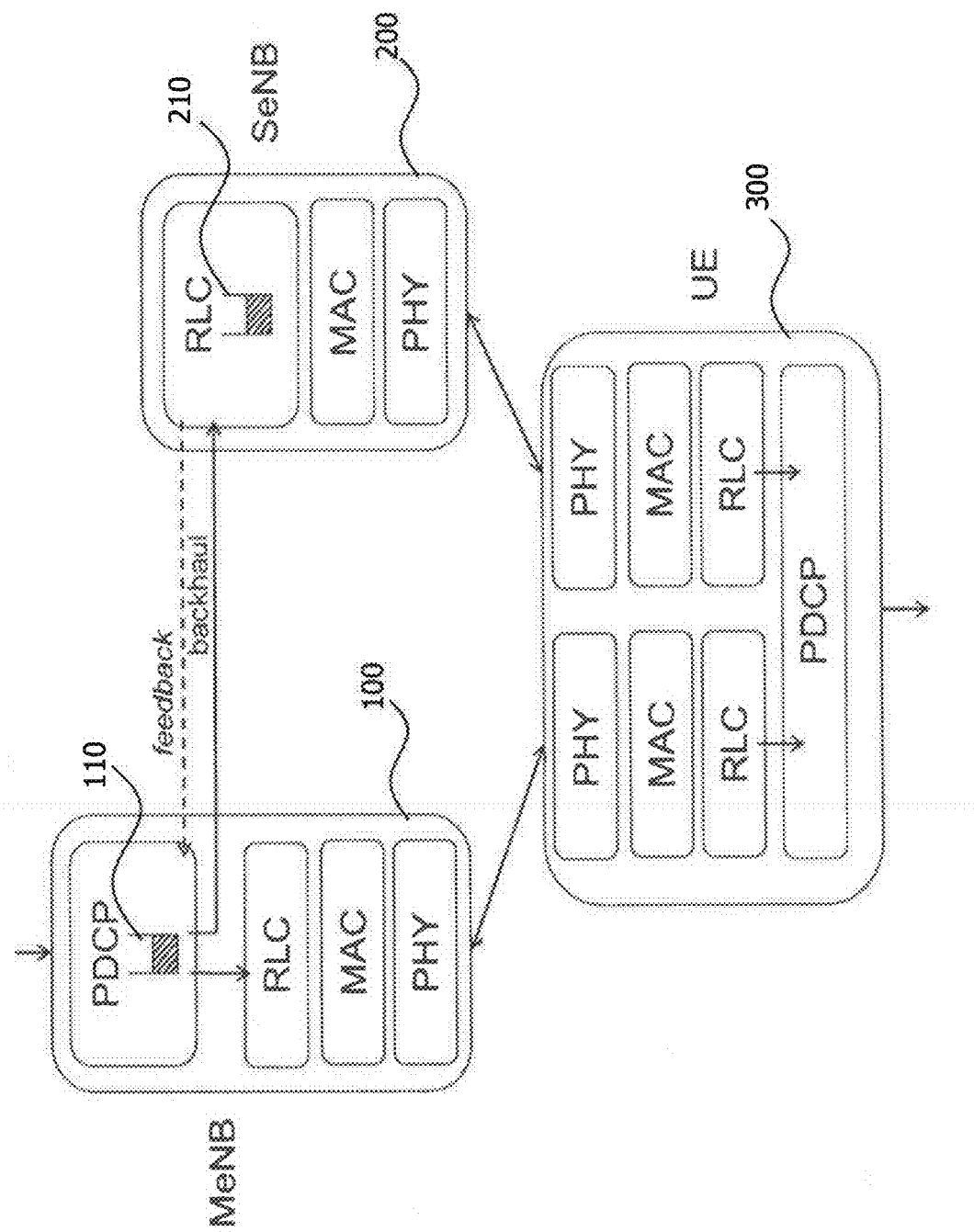
FIG. 1b is a schematic illustration of Dual Connectivity.
Figure 2:
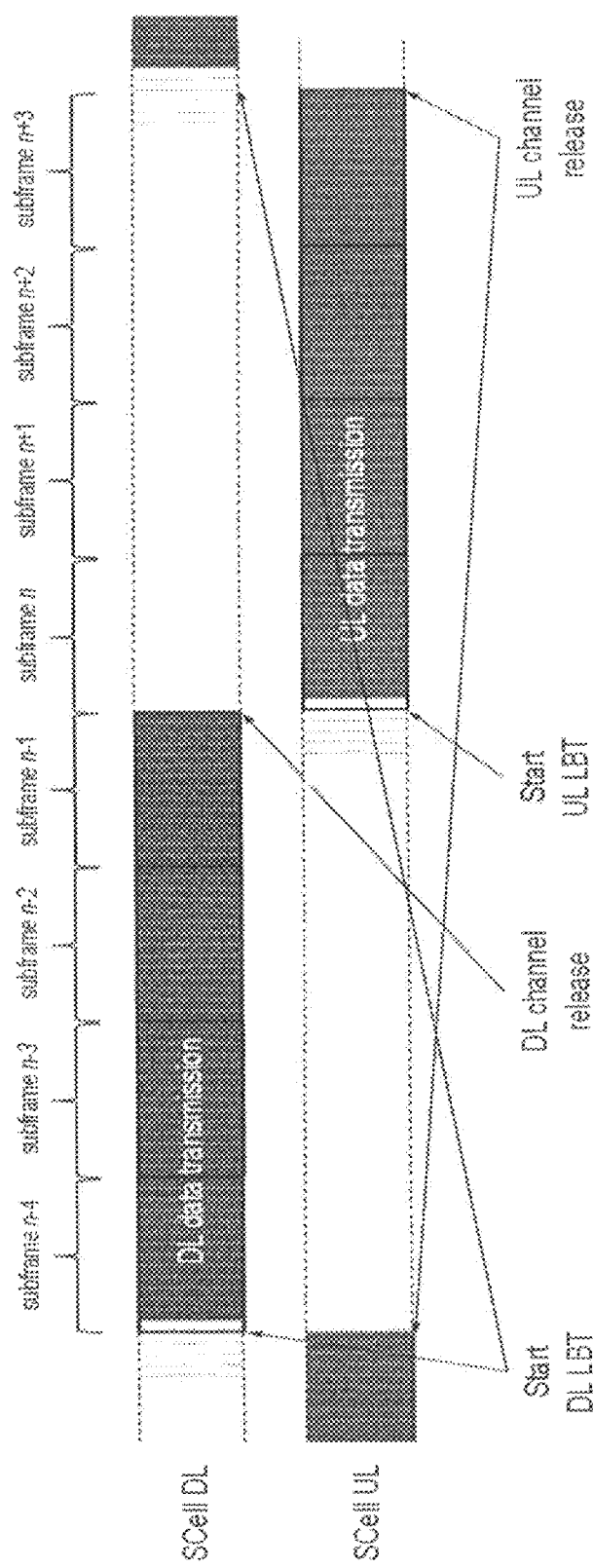
FIG. 2 is a schematic illustration of TDD based Licensed Assisted Access to unlicensed spectrum using LTE carrier aggregation and listen-before-talk.
Figure 4:
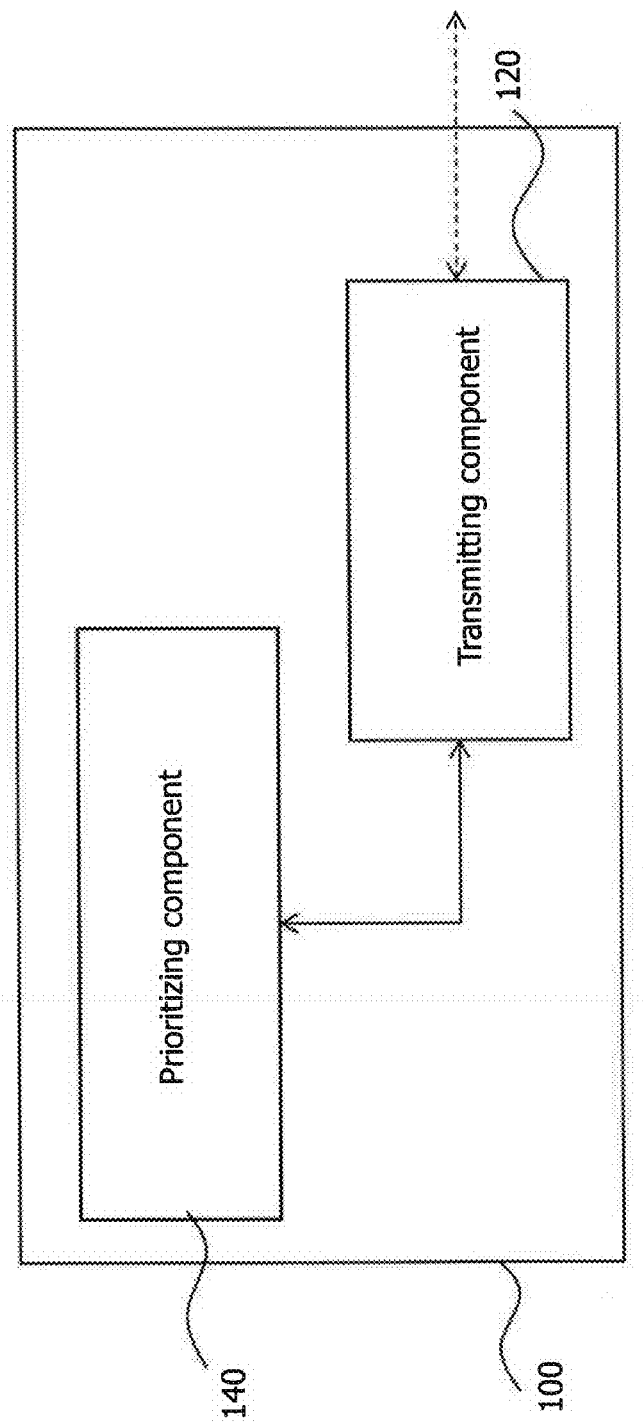
FIG. 4 is a schematic illustration of an embodiment of an access network node.

FIG. 4 shows an access network node 100 for prioritizing Downlink (DL) transmission in a Time Division Duplex (TDD) wireless communication system (reference sign 100 is assigned to the access network node to exemplify that the access network node 100 of FIG. 4 may be used in the architectures of FIGS. 1*a* and 1*b*). In other words, access network node 100 may be implemented as eNB 100 providing PCell 100*a* and SCell 100*b* in accordance with FIG. 1*a*. Alternatively, access network node 100 may be implemented as MeNB 100 of FIG. 1*b*. The wireless communication system provides a channel sensing mechanism. The access network node 100 comprises a transmitting component 120 and a prioritizing component 140. The transmitting component 120 is configured to transmit an Uplink (UL) grant to a wireless communication device. The UL grant indicates that an UL transmission is planned in one or more first subframes. The prioritizing component 140 is configured to prioritize DL transmission in one or more second subframes over the planned UL transmission. The one or more second subframes overlap at least partially with the one or more first subframes.

Reference sign 100 is assigned to the access network node in order to exemplify that the access network node may be used as or may comprise or may be part of eNB 100 implementing PCell 100*a* and SCell 100*b* functionalitiy of FIG. 1*a* or MeNB 100 functionalities of FIG. 1*b*, for example.

Before further details of access network node 100 are described with reference to FIGS. 5 to 8, some additional information is provided that is useful for understanding details of the present disclosure. When a clear channel mechanism is implemented, network nodes, before accessing a wireless medium, usually, first, determine the state of the medium through the process of carrier sense (channel sense), prior to being allowed to ultimately transmit a frame. Carrier sense is normally composed of Clear Channel Assessment (CCA) and the Network Allocation Vector (NAV). From a high level perspective, CCA is physical carrier sense which listens to received energy on the radio interface. CCA indicates a busy medium for the current frame. One example is carrier sense multiple access with collision avoidance (CSMA/CA) MAC protocol used with IEEE 802.11 WLANs.

Returning now to FIGS. 5 to 8, FIG. 5 shows a method embodiment which can be implemented in access network node 100 shown in FIG. 4. In step S502, transmitting component 120 transmits an Uplink (UL) grant to a wireless communication device. The UL grant indicates that an UL transmission is planned in one or more first subframes. In step S504, prioritizing component 140 prioritizes Downlink (DL) transmission in one or more second subframes over the planned UL transmission. The one or more second subframes at least partially overlap with the one or more first subframes.

In other words, the method comprises transmitting in step S502, by the transmitting component 120 of access network node 100, an Uplink (UL) grant to a wireless communication device. The UL grant indicates that an UL transmission is planned in one or more first subframes. The method further comprises prioritizing in step S504, by the prioritizing component 120 of access network node 100, Downlink (DL) transmission in one or more second subframes over the planned UL transmission. The one or more second subframes at least partially overlap with the one or more first subframes.

Specific details which may be implemented in or by access network node 100 of FIG. 4 and the method of FIG. 5 are further explained with respect to FIGS. 6*a* to 7*b*. More specifically, several exemplary implementations of prioritizing (step S504) the DL transmission are explained below.

The description below is generally applicable for systems where both DL and UL use the same frequency (e.g. TDD systems) and follows channel sensing, e.g. LBT, protocols for channel access.

Figure 6A:
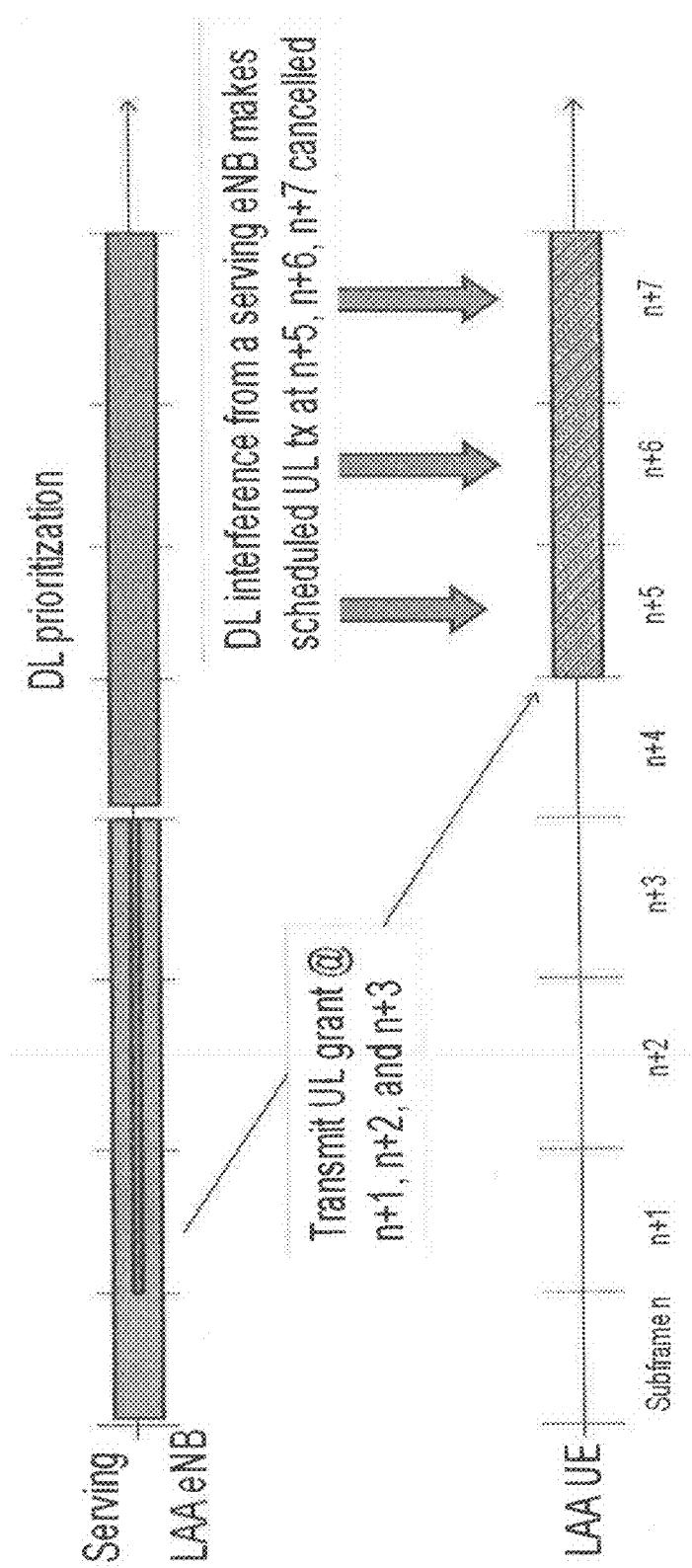
FIGS. 6a to 6c are schematic illustrations of exemplary implementations of downlink transmission prioritization over planned UL transmission.

FIG. 6*a* shows an exemplary implementation of prioritizing step S504. In other words, FIG. 6*a* shows an example of downlink transmission prioritization over planned UL transmission. In accordance therewith, the step of prioritizing S504 comprises starting, by eNB 100, the DL transmission in one or more second subframes before the planned UL transmission in one or more first subframes is to be started. As can be seen by way of example in FIG. 6*a*, UL grant is transmitted at subframe n+1 to n+3 together with downlink data transmission. So, these grants indicate that UL transmissions are planned for subframes n+5, n+6 and n+7. Then, downlink transmission releases the channel at n+3. In subframe n+4, i.e. before start of the UL transmission planned for subframes n+5, n+6 and n+7, eNB 100 grabs the medium for DL transmission again. In a normal situation, eNB 100 releases the medium before subframe n+5 so that the scheduled UE 300 can start its planned UL transmission in subframe n+5.

However, according to the present disclosure, eNB 100 wants to keep the DL transmission due to various reasons although the UL transmission is already scheduled from subframe n+5. Such reasons may include urgent control signals or quality of service packet arrivals such as VoIP at eNB 100. Without transmitting any extra control signals to cancel the planned UL transmission, eNB 100 simply transmits DL packets before the time that the UE 300 starts to sense the channel for its planned UL transmission. In consequence, UE 300 detects the DL transmission and thus defers or cancels the planned UL transmission. More specifically, UE 300 detects interference from its serving eNB 100 and defers or cancels the planned UL transmission. This automatically causes to cancel the planned UL transmission at subframes n+5, n+6, n+7. Instead, use of one or more of those subframes is yield for DL transmission. The UL transmission may take place at a later instance.

In this exemplary implementation of the prioritizing step S504 as explained with respect to FIG. 6*a*, EPDCCH based self-scheduling mode can be used for explanation rather than limitation. Scheduled UL transmission at subframe n+5 is deferred and automatically cancelled because of DL interference from serving eNB 100. In accordance with the exemplary implementation of FIG. 6*a*, immediate downlink transmission prioritization over planned uplink transmission is provided.

Figure 6B:
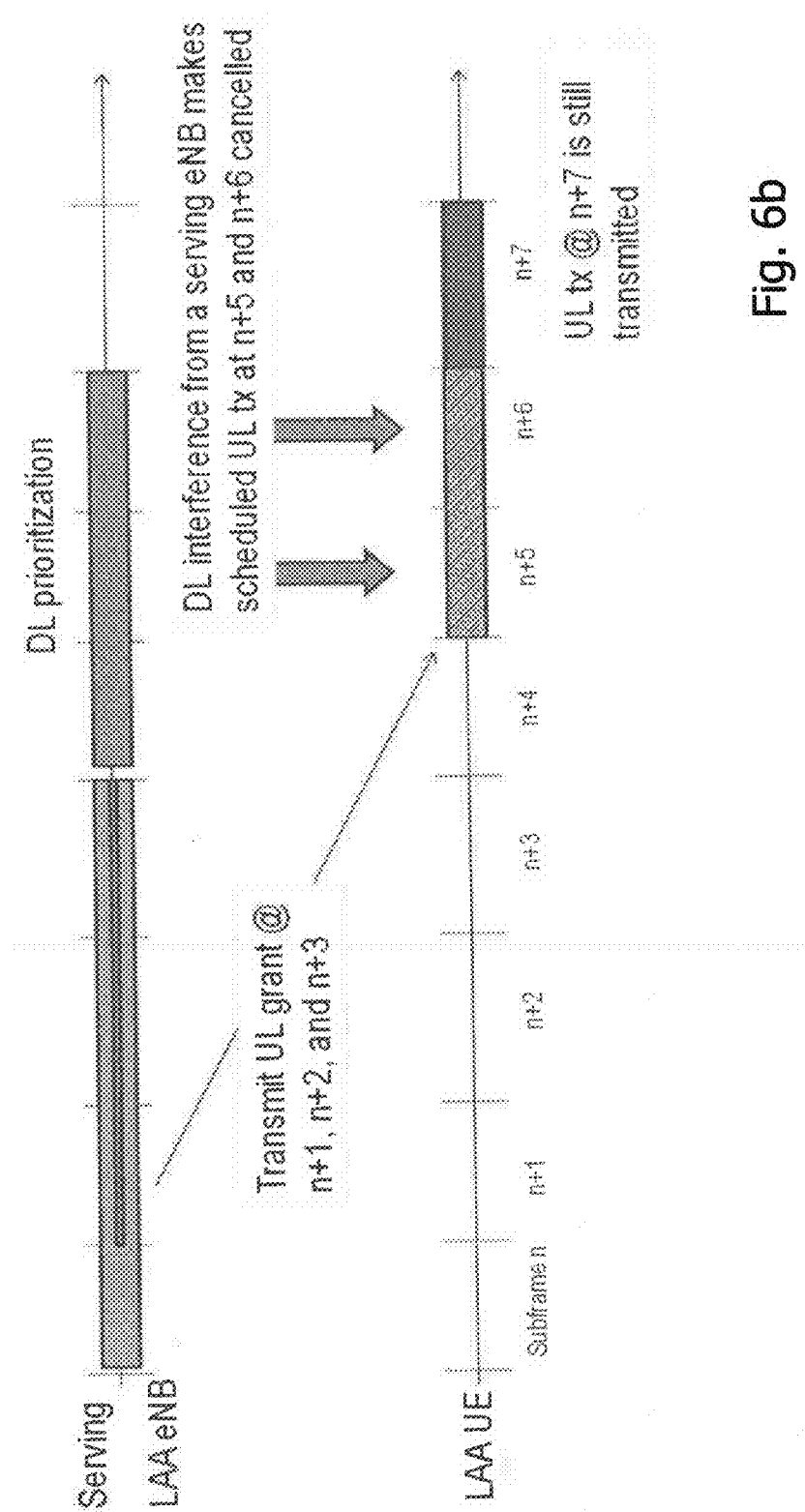

FIG. 6*b* shows an exemplary implementation of prioritizing step S504. The exemplary implementation of FIG. 6*b* may use (partial) downlink transmission prioritization when using EPDCCH based self-scheduling mode. The exemplary implementation of FIG. 6*b* can be considered a modification of the exemplary implementation of FIG. 6*a*.

In FIG. 6*b*, DL transmission duration adjustment for partial prioritization is illustrated. Prioritized DL transmission duration can be shorter than a regular one or can be shortened to become shorter than a regular one. In other words, The UL transmission may take place at a later instance.

In this exemplary implementation of the prioritizing step S504 as explained with respect to FIG. 6*a*, EPDCCH based self-scheduling mode can be used for explanation rather than limitation. Scheduled UL transmission at subframe n+5 is deferred and automatically cancelled because of DL interference from serving eNB 100. In accordance with the exemplary implementation of FIG. 6*a*, immediate downlink transmission prioritization over planned uplink transmission is provided.

FIG. 6*b*6*b* shows that the prioritized DL transmission duration can be shorter than regular transmission case or can appropriately be shortened. For example, the transmission duration of the DL transmission may be reduced to stop before subframe n+7, e.g. at subframe n+6. By doing so, a part of the scheduled UL transmission in subframes n+5 and n+6 is cancelled or deferred and the rest of the scheduled UL transmission can use originally intended subframe n+7. This allows subframe n+7 to still be used by originally scheduled UL transmission. In other words, UE 300 may be instructed by eNB 100 to start at least a part of the planned UL transmission at a subframe after the end of the DL transmission, if the DL transmission ends before the end of the planned UL transmission. The end of the DL transmission may be the intended end or may be the end that is achieved by shortening the intended DL transmission.

As stated above, eNB 100 may adjust the transmission duration of the DL transmission. In one specific implementation, the transmission duration may be adjusted to control the prioritization level of the DL transmission over the planned UL transmission. That is, adjusting the prioritized DL transmission duration can control the priority level. For example, adjusting the transmission duration of the DL transmission may be implemented by adjusting the transmission duration of the DL transmission based on a prioritization level of the DL transmission over the planned UL transmission. If the prioritization level of the DL transmission is equal to or higher than a predetermined threshold, the DL transmission may not be shortened or only slightly shortened, e.g. by only one subframe. If the prioritization level of the DL transmission is lower than a predetermined threshold, the DL transmission may be shortened or significantly shortened, e.g. by two or more subframes, so that at least a part, e.g. all, of the planned UL transmission can take place as planned.

Although the exemplary implementation of FIG. 6*b* is only described with respect to FIG. 6*a*, this is only for explanation rather than limitation. In other words, the exemplary implementation of FIG. 6*b* can equally be applied to the exemplary implementation of FIG. 6*c* as well, for example.

Figure 6C:
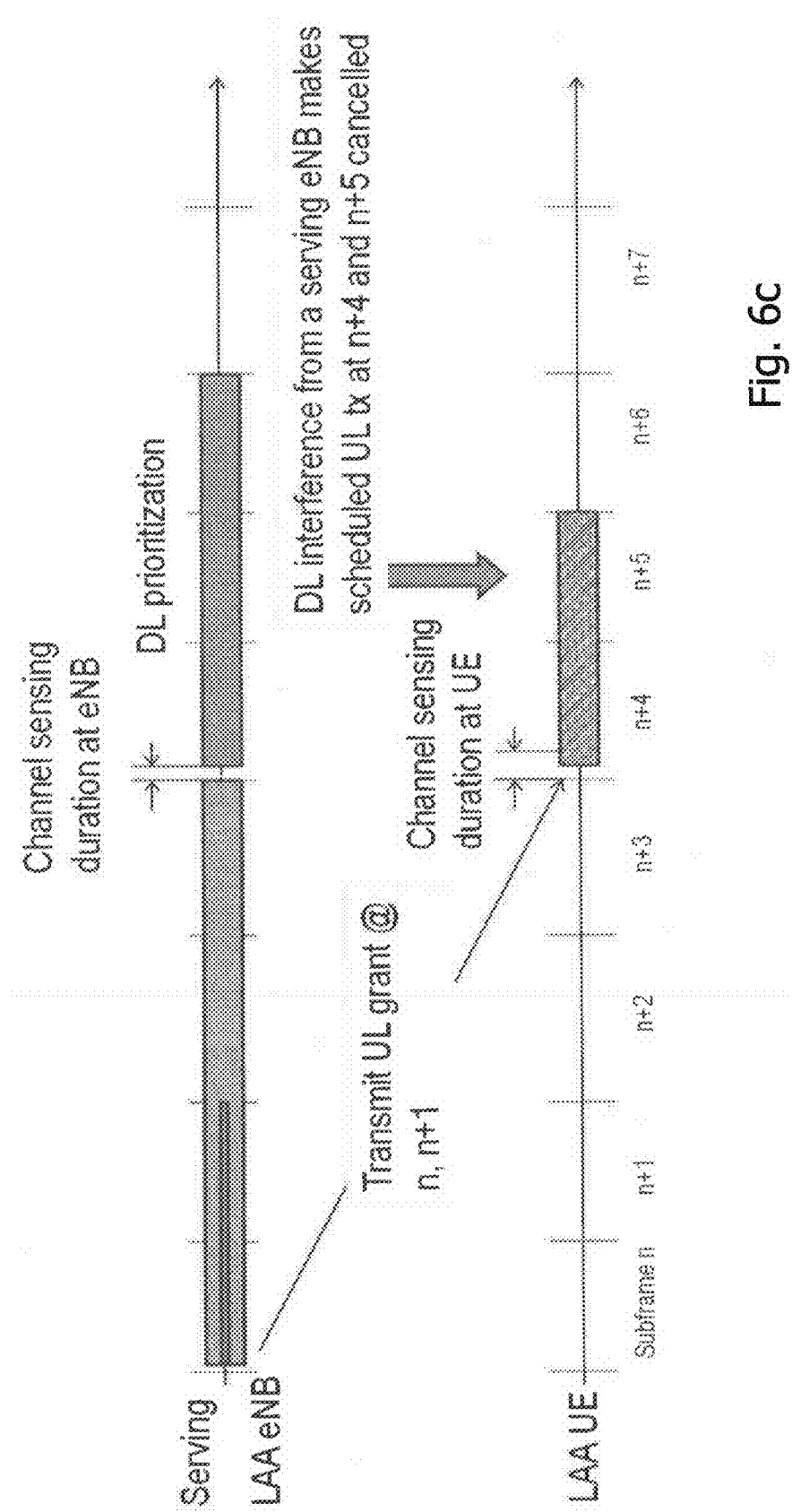

FIG. 6*c* shows an exemplary implementation of prioritizing step S504. More particularly, FIG. 6*c* illustrates adaptation of listen-before-talk settings (as an example for channel sensing settings) for prioritization of downlink transmission over planned uplink transmission. Similarly as explained with respect to the exemplary implementation of FIG. 6*a*, eNB 100 has transmitted UL grants in subframes n and n+1 to schedule UE 300 for UL transmission in subframes n+4 and n+5. However, eNB 100 figures out later in subframe n+2 or n+3 that DL transmissions are more important and must be prioritized. In this case, eNB 100 may adapt one or more LBT parameters of the planned UL transmission and/or one or more LBT parameters of the DL transmission. The one or more LBT parameters of the planned UL transmission and/or the one or more LBT parameters of the DL transmission may be adapted such that the probability for eNB 100 to access the wireless communication medium for the DL transmission is higher than the probability for UE 300 to access the wireless communication medium for the planned UL transmission.

For example, eNB 100 can change the LBT parameters of the DL transmissions or the LBT parameters of the UL transmissions so that the probability for eNB 100 to grab the medium in subframe n+4 is larger than the probability for UE 300 to grab the medium in subframe n+4. In consequence, eNB 100 will, most likely, grab the medium for the DL transmission. The planned UL transmission may be deferred or cancelled as explained with respect to FIG. 1*a*, for example.

The one or more LBT parameters may comprise at least one of a contention window size, a minimum sensing duration and a sensing slot duration. The LBT parameters, e.g. contention window size, minimum sensing duration, sensing slot duration, influence the channel sensing duration. For example, a duration of sensing, by eNB 100, the channel before starting the DL transmission can be decreased. If the duration of sensing is decreased, then it is more unlikely to sense a busy communication medium. In consequence, it is more likely for eNB 100 to grab the medium for the DL transmission. Alternatively or additionally, a duration of sensing, by UE 300, the channel before starting the planned UL transmission can be increased. If the duration of sensing is increased, then it is more likely to sense a busy communication medium. In consequence, it is less likely for UE 300 to grab the medium for the planned UL transmission.

If eNB 100 decides to prioritize DL transmissions by modifying the LBT parameters at UE 300, the new LBT parameters for the UL transmissions have to be communicated to UE 300 in subframe n+2 or n+3 (before subframe n+4). In this way, the likelihood of UE 300 to grab the channel for the UL transmission can be influenced.

In general, various metrics are conceivable to trigger the DL prioritization over the planned UL transmission as described above with respect to FIGS. 4, 5 and 6a to 6c. Independent of the exact trigger, the step of prioritizing S504 can be triggered based on one or more metrics related to eNB 100. The one or more metrics comprise at least one of a buffer fill state of a data buffer associated with eNB 100, a buffer fill rate of a data buffer associated with eNB 100, an interference level measured at eNB 100, and arrival of one or more urgent packets at eNB 100. The one or more urgent packets may be related to at least one of control information, emergency notice information, and Quality of Service (QoS) information. For example, sudden DL buffer size increase due to bursty traffic arrival, increase in interference level measured at eNB 100, and urgent packet arrival such as quality of service, e.g. Voice over IP (VoIP) or control signals are conceivable.

As mentioned above, a buffer fill state of a data buffer associated with eNB 100 and/or a buffer fill rate of a data buffer associated with eNB 100 can be considered as triggers. The data buffer may be the data buffer of eNB 100 in case of LAA operation with or without DC. Alternatively, the data buffer may be the data buffer 110 of Primary-eNB 100 or data buffer 210 of Secondary-eNB 200. For sake of explanation rather than limitation, it is, in the following referred to the data buffers 110, 210 of FIG. 1b. However, in a similar way, the triggers exemplarily described below may be related to the data buffer of eNB 100 of FIG. 1a.

As exemplarily shown in FIG. 1b, Primary-eNB 100 (as an example in DC of eNB 100) comprises a data buffer 110. Data buffer 110 may be referred to as PDCP buffer 110, for sake of explanation rather than limitation, as it is arranged, in the example of FIG. 1b, in PCDP layer. Likewise, as exemplarily shown in FIG. 1b, Secondary-eNB 200 comprises a data buffer 210. Data buffer 210 may be referred to as RLC buffer 210, for sake of explanation rather than limitation, as it is arranged, in the example of FIG. 1b, in RLC layer. Still further, UE 300 and an exemplary protocol stack of UE 300 are shown in FIG. 1b.

The buffer fill state of data buffer 110 associated with Primary-eNB 100 and the buffer fill rate of data buffer 110 associated with Primary-eNB 100 may be used as a trigger.

According to a first exemplary implementation, a buffer fill state of PDCP buffer 110 of eNB 100/Primary-eNB 100 is monitored. If the buffer fill state increases, this may trigger that DL transmission shall be prioritized to reduce the buffer fill state.

Alternatively or additionally, the buffer fill rate of PDCP buffer 110 of eNB 100/MeNB 100 may be monitored. If the buffer fill rate increases, it may be assumed that the buffer fill state increases in the future. In consequence, DL prioritization may be triggered to reduce the possibly increasing buffer fill state.

In this way, the buffer fill state and thus also the buffer fill rate may be monitored and used as a basis for prioritizing DL transmissions over planned UL transmissions.

The details explained above with respect to FIGS. 4 to 6c may be summarized with respect to FIG. 7. FIG. 7 is a block diagram schematically illustrating a device embodiment of a node 2 for prioritizing Downlink (DL) transmission in a Time Division Duplex (TDD) wireless communication system providing or employing a channel sensing mechanism. Node 2 may be seen as representing an apparatus such as access network node 100 as disclosed herein.

The node 2 comprises a memory or memory arrangement 4 and a processor or processor arrangement 6. The memory or memory arrangement 4 contains control instructions or program code portions executable by the processor or processor arrangement 6. The processor or processor arrangement is configured to transmit an Uplink (UL) grant to a wireless communication device. The UL grant indicates that an UL transmission is planned in one or more first subframes. The processor or processor arrangement 6 is configured to prioritize Downlink (DL) transmission in one or more second subframes over the planned UL transmission. The one or more second subframes at least partially overlap with the one or more first subframes. A processor arrangement may generally comprise one or more than one processors and/or processor cores. A processor or processor core may comprise integrated control or processing circuitry. A memory arrangement may comprise one or more than one memories, which may be of same or different types. A memory may comprise RAM (Random Access Memory), ROM (Read-Only Memory), EPROM, cache memory, optical memory, etc.

Figure 8:
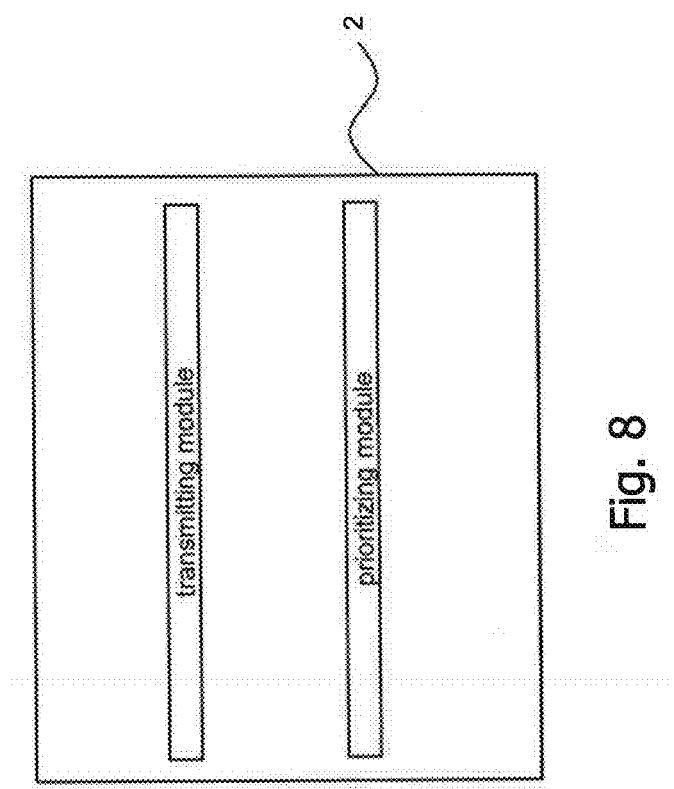
FIG. 8 is a block diagram schematically illustrating another device embodiment for implementing the access network node of FIG. 4.

FIG. 8 shows a functional block diagram of a device or node 2 configured in accordance with the principles of the disclosure as described above. In particular, device or node 2 may be seen as representing an apparatus such as access network node 100 for prioritizing Downlink (DL) transmission in a Time Division Duplex (TDD) wireless communication system providing or employing a channel sensing mechanism as disclosed herein. The functional blocks of the device may be implemented by hardware, software, or a combination of hardware and software to carry out the principles of the disclosure. It is understood by a person skilled in the art that the functional blocks described in FIG. 8 may be combined or separated into sub-blocks to implement the principles of the disclosure as described above. Therefore, the description herein may support any possible combination or separation or further definition of the functional blocks described herein. The device of FIG. 8 is for prioritizing Downlink (DL) transmission in a Time Division Duplex (TDD) wireless communication system employing a channel sensing mechanism. The device 2 comprises a transmitting module for transmitting an Uplink (UL) grant to a wireless communication device. The UL grant indicates that an UL transmission is planned in one or more first subframes. The device 2 further comprises a prioritizing module for prioritizing Downlink (DL) transmission in one or more second subframes over the planned UL transmission. The one or more second subframes at least partially overlap with the one or more first subframes.

As described herein, DL traffic can be prioritized over planned UL transmission in various way, e.g. by early transmitting DL packets and letting scheduled UL be deferred by detecting interference from a serving eNB. In general, after the UL grant signal is transmitted, DL transmission may need to be prioritized over scheduled UL transmission. This may be the case when urgent packets, e.g., control packets, emergency notice or QoS packets, arrive for DL transmission before UL transmission instance. In this case, it will be more efficient to prioritize DL transmission. However, traditional LTE systems do not have such mechanism to prioritize DL transmission over planned UL transmission.

For example, embodiments are described above that, if UL grant is already transmitted but eNB wants to prioritize DL transmission over the planned UL transmission, eNB transmits DL packets earlier than UL transmission and then UL transmission is automatically cancelled due to interference from a serving eNB based on an LBT operation. In this way, DL transmission can be prioritized over already planned UL transmission without extra control signaling overhead when TDD based LBT systems are considered.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of prioritizing Downlink, DL, transmission in a Time Division Duplex, TDD, wireless communication system providing a channel sensing mechanism, the method comprising:
    transmitting, by an access network node of the wireless communication system, an Uplink, UL, grant to a wireless communication device, the UL grant indicating that an UL transmission is planned in one or more first subframes; and
    prioritizing, by the access network node, a Downlink, DL, transmission in one or more second subframes over the planned UL transmission, the one or more second subframes at least partially overlapping with the one or more first subframes, wherein a transmission duration of the prioritized DL transmission is adjusted by reducing the transmission duration of the DL transmission based on a prioritization level of the DL transmission meeting a predetermined threshold;
        wherein prioritizing the DL transmission comprises adapting, by the access network node, one or more channel sensing parameters of the planned UL transmission,
        wherein the one or more channel sensing parameters comprise a contention window size, and wherein adapting the one or more channel sensing parameters comprises decreasing a duration of sensing, by the access network node, a wireless communication medium before starting the DL transmission.

2. The method of claim 1, wherein the step of prioritizing comprises starting, by the access network node, the DL transmission in the one or more second subframes before the planned UL transmission in the one or more first subframes is to be started.

3. The method of claim 2, the method comprising:
    detecting, by the wireless communication device, the DL transmission in at least one of the one or more first subframes; and
    deferring or cancelling, by the wireless communication device, the planned UL transmission.

4. The method of claim 1, wherein the at least one of the one or more channel sensing parameters of the planned UL transmission and the one or more channel sensing parameters of the DL transmission are adapted such that the probability for the access network node to access a wireless communication medium for the DL transmission is higher than the probability for the wireless communication device to access the wireless communication medium for the planned UL transmission.

5. The method of claim 1, wherein the one or more channel sensing parameters comprise at least one of a minimum sensing duration and a sensing slot duration.

6. The method of claim 1, wherein the method comprises triggering the step of prioritizing based on one or more metrics related to the access network node.

7. The method of claim 6, wherein the one or more metrics comprise at least one of a buffer fill state of a data buffer associated with the access network node, a buffer fill rate of a data buffer associated with the access network node, an interference level measured at the access network node, and arrival of one or more urgent packets at the access network node.

8. The method of claim 7, the one or more urgent packets being related to at least one of control information, emergency notice information, and Quality of Service, QoS, information.

9. The method of claim 1, the method comprising adjusting, by the access network node, the transmission duration of the DL transmission.

10. The method of claim 9, wherein the step of adjusting the transmission duration of the DL transmission comprises adjusting the transmission duration of the DL transmission based on a prioritization level of the DL transmission over the planned UL transmission.

11. The method of claim 9, wherein the step of adjusting the transmission duration of the DL transmission comprises reducing the transmission duration of the DL transmission.

12. The method of claim 1, the method comprising instructing the wireless communication device to start at least a part of the planned UL transmission at a subframe after the end of the DL transmission, if the DL transmission ends before the end of the planned UL transmission.

13. An access network node for prioritizing Downlink, DL, transmission in a Time Division Duplex, TDD, wireless communication system providing a channel sensing mechanism, the access network node comprising:
    a transmitting component configured to transmit an Uplink, UL, grant to a wireless communication device, the UL grant indicating that an UL transmission is planned in one or more first subframes; and
    a prioritizing component configured to prioritize a Downlink, DL, transmission in one or more second subframes over the planned UL transmission, the one or more second subframes at least partially overlapping with the one or more first subframes, wherein a transmission duration of the prioritized DL transmission is adjusted by reducing the transmission duration of the DL transmission based on a prioritization level of the DL transmission meeting a predetermined threshold and
    wherein the prioritizing the DL transmission comprises adapting, by the access network node,
    one or more channel sensing parameters of the planned UL transmission,
        wherein the one or more channel sensing parameters comprise a contention window size, and
        wherein adapting the one or more channel sensing parameters comprises:
            decreasing a duration of sensing, by the access network node, a wireless communication medium before starting the DL transmission.

14. The access network node of claim 13, wherein the prioritizing component is further configured to prioritize by starting the DL transmission in the one or more second subframes before the planned UL transmission in the one or more first subframes is to be started.

15. The access network node of claim 13, the access network node comprising or being configured as or being part of a radio base station, a radio network controller, a NodeB, an eNodeB, 5G base station or an access point.

\* \* \* \* \*